(12) United States Patent
Lobel et al.

(10) Patent No.: US 8,187,108 B2
(45) Date of Patent: May 29, 2012

(54) LONGITUDINAL SHAFT ASSEMBLY FOR A MOTOR VEHICLE

(75) Inventors: Wolfgang Lobel, Frankfurt (DE); Sven Lehmann, Oberhausen (DE); Frank Pflanzer, Grundau (DE)

(73) Assignee: GKN Driveline Deutschland GmbH (DE)

( * ) Notice: Subject to any disclaimer, the term of this patent is extended or adjusted under 35 U.S.C. 154(b) by 290 days.

(21) Appl. No.: 12/562,714

(22) Filed: Sep. 18, 2009

(65) Prior Publication Data

US 2010/0081511 A1   Apr. 1, 2010

(30) Foreign Application Priority Data

Sep. 22, 2008   (DE) .......................... 10 2008 048 388

(51) Int. Cl.
*F16D 3/227* (2006.01)
(52) U.S. Cl. ....................................... 464/146; 464/906
(58) Field of Classification Search .................. 464/140, 464/146, 167, 178, 906; 280/777
See application file for complete search history.

(56) References Cited

U.S. PATENT DOCUMENTS

| | | | |
|---|---|---|---|
| 6,015,350 A * | 1/2000 | Breese | 280/777 X |
| 6,585,601 B2 * | 7/2003 | Booker et al. | 464/146 |
| 2008/0153607 A1 * | 6/2008 | Frost et al. | |

FOREIGN PATENT DOCUMENTS

| | | |
|---|---|---|
| DE | 102 37 172 B3 | 4/2004 |
| DE | 11 2004 000 239 T5 | 1/2006 |
| DE | 10 2005 022 483 A1 | 11/2006 |
| DE | 10 2007 015 074 A1 | 7/2008 |
| JP | 2008-132952 A | 6/2008 |

OTHER PUBLICATIONS

Abstract not available for DE 10237172, submitting Abstract of corresponding document: WO 2004018247.
Abstract not available for DE 112004000239 (T5), submitting Abstract of corresponding document: WO 2004071797.
Abstract not available for DE 102007015074, submitting Abstract of corresponding document: WO 2008077371.
English Abstract of DE 10 2005 022 483.
English Abstract of JP 2008-132952 (1 page).
English Translation of JP 2008-132952 (14 pages).

\* cited by examiner

*Primary Examiner* — Gregory Binda
(74) *Attorney, Agent, or Firm* — Rader, Fishman & Grauer PLLC

(57) ABSTRACT

A longitudinal shaft assembly for a motor vehicle, comprising at least a first shaft and a second shaft, a ball-type constant velocity joint for connecting the first shaft to the second shaft and at least one central bearing for supporting the longitudinal shaft assembly with respect to a body of the motor vehicle.

6 Claims, 4 Drawing Sheets

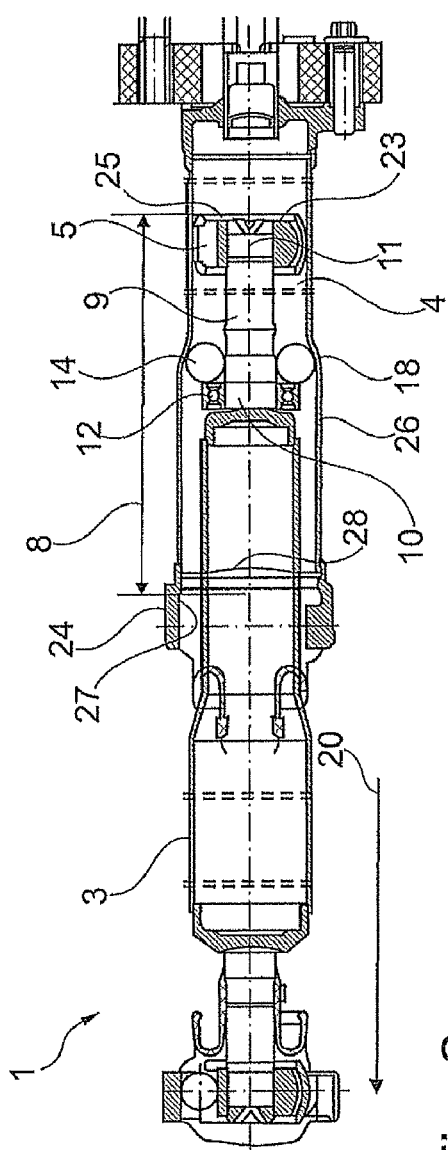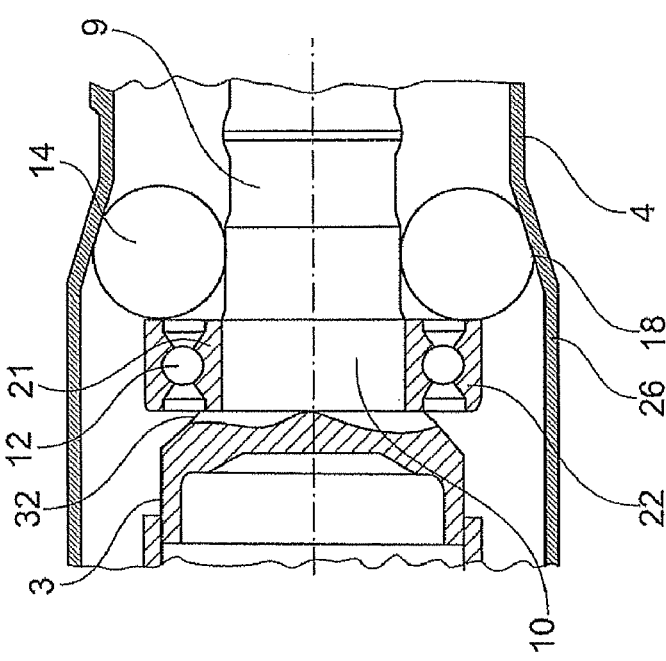
Fig. 2
Fig. 3

LONGITUDINAL SHAFT ASSEMBLY FOR A MOTOR VEHICLE

CROSS REFERENCE TO RELATED APPLICATION

This application claims priority to German patent application DE 10 2008 048 388.5, filed Sep. 22, 2008, which is hereby incorporated by reference herein in its entirety.

TECHNICAL FIELD

The present disclosure relates to a longitudinal shaft ("propshaft") assembly for a motor vehicle, at least a first shaft and a second shaft being provided which are connected to one another by means of a ball-type constant velocity joint in order to connect a drive input side to a drive output side of the motor vehicle. The longitudinal shaft assembly is generally used to transmit the driving force from the drive input (e.g. engine and/or transmission) to the drive output (e.g. differential, axle gears, transmission) of the motor vehicle, the longitudinal shaft assembly extending in the direction of the vehicle and transmitting the driving force to the rear wheels when the drive input is installed in the front region of the vehicle, or to the front wheels when the drive input is arranged in the rear region.

BACKGROUND

Longitudinal shaft assemblies represent a stiff structure in the motor vehicle which must be designed, in particular, with a view to its crash behaviour. A primary concern when designing longitudinal shaft assemblies is therefore to ensure that no component of the longitudinal shaft assembly becomes detached from the longitudinal shaft assembly in such a manner that it would penetrate other regions of the vehicle. Thus it must be avoided, in particular, that parts of the longitudinal shaft assembly penetrate the passenger compartment and/or the fuel tank, whereby additional danger of injury to the vehicle occupants or fire risk through escaping fuel could occur.

Such longitudinal shaft assemblies have at least a first shaft and a second shaft by means of which the driving force of the motor vehicle is transmitted. In this case the shafts are connected to one another by means of a ball-type constant velocity joint which preferably has a limited range of axial displacement. Through the axial displacement range of the ball-type constant velocity joint, movements of individual components of the longitudinal shaft assembly or of the motor vehicle in the longitudinal direction of the vehicle are compensated. In addition, deflections of the shafts with respect to one another arising from the ball-type constant velocity joint are compensated by articulation of the constant velocity joint.

As a rule, a central bearing arranged on at least one shaft is provided to mount the longitudinal shaft assembly to the motor vehicle. This bearing, which is necessary to guide the longitudinal shaft assembly, additionally serves to damp and reduce vibrations arising in the longitudinal shaft assembly.

Longitudinal shaft assemblies of the aforementioned type must be designed for the particular application, in particular with regard to the driving force to be transmitted. Further parameters include the overall length of the longitudinal shaft assembly, the space available in the motor vehicle, the weight of the motor vehicle and crash requirements.

SUMMARY

The individual features listed in the dependent claims may be combined with one another in any desired technologically useful manner and define further configurations of the disclosure. In addition, the features specified in the claims are defined and explained in more detail in the following description, where further configurations are described.

A longitudinal shaft assembly for a motor vehicle is provided, which has at least a first shaft and a second shaft, a ball-type constant velocity joint for connecting the first shaft to the second shaft and at least one central bearing for supporting the longitudinal shaft assembly with respect to a body of the motor vehicle, the longitudinal shaft assembly being designed with a view to telescoping in the event of a crash, deformation forces of less than 80 kN (80 000 Newtons) being generated and at the same time a deformation energy as high as possible being absorbed by the longitudinal shaft assembly as a function of travel.

The longitudinal shaft assembly includes in particular a first shaft which is configured at least partially as a hollow shaft in order to have a bending strength as great as possible combined with lightweight construction and at the same time to be able to transmit high torques, and is connected to the body by means of a central bearing, in particular in the form of a rolling bearing, so that the longitudinal shaft assembly is supported on the body of the motor vehicle via the first shaft and the central bearing. The rolling bearing has an inner ring and an outer ring with rolling bodies arranged between them, the inner ring being arranged on the circumference of the first shaft. The outer ring of the rolling bearing is connected to the body of the motor vehicle. The rolling bearing is supported by at least its inner ring against a second stop on the first shaft. On the side of the rolling bearing opposite the second stop, the first shaft continues in particular in the form of a spigot, the end of which receives the inner part of a ball-type constant velocity joint. The outer part of the ball-type constant velocity joint is received in a second shaft which continues in the longitudinal direction at least zonally as a hollow shaft.

In the event of a crash, in particular in the context of a crash test of the motor vehicle or only of individual components, preferably in a frontal crash (EURO-NCAP, US-NCAP, IIHS, FMVSS 208), by which the longitudinal shaft assembly is shortened in the longitudinal direction, the first shaft with the spigot and the inner part of the ball-type constant velocity joint penetrates the second (hollow) shaft. As this happens, the balls of the ball-type constant velocity joint bear against the outer part of the ball-type constant velocity joint so that any ball cage present is burst by the axial forces arising. The first shaft now penetrates further into the second shaft while the balls of the ball-type constant velocity joint remain in their axial positions as a result of stops of the second shaft and/or diameter reductions of the second shaft, and move with respect to the first shaft in the direction of the central bearing. Cover elements may be provided inside the second shaft, which are then penetrated by the spigot of the first shaft, with further deformation energy being absorbed. The joint outer part may also have a closed configuration, that is, with a cover integrated on one side.

As the first shaft penetrates further into the second shaft, the balls are pushed by the inner part of the ball-type constant velocity joint onto the surface of the spigot of the first shaft and are thus arranged on an, in particular, smaller diameter (spigot of the first shaft). As a result of the movement of the balls radially inwards, the balls are released from the stops and/or the diameter reductions of the outer part of the ball-type constant velocity joint and/or of the second (hollow) shaft and can therefore penetrate further into the second shaft together with the first shaft. The balls then come directly into abutment against a second stop on the circumference of the first shaft or, in particular, against the rolling bearing on the first shaft, and are gripped between the second stop or the rolling bearing and a further diameter reduction of the second shaft in such a manner that an increase of the axial force is produced. In this position, the outer rolling bearing ring may possibly be burst, so that the balls bear against the inner ring of the rolling bearing and against a diameter reduction of the second shaft.

As a result of the arrangement of the second stop of the rolling bearing inner ring on the first shaft rearwardly with respect to the balls of the ball-type constant velocity joint, the balls are now moved with the first shaft axially into the second shaft and expand a suitably-configured diameter reduction of the second (hollow) shaft axially. As this happens, the balls of the ball-type constant velocity joint locally displace the wall of the second shaft at their respective positions and thus absorb the crash energy present through deformation work of the second shaft. Through the guide length of the telescoped shafts, which is present by means of the adaptation of the ball diameters and the position of the balls on a circumference of defined diameter, and through the configuration of the diameter reduction of the second shaft, a maximum possible axial force can be set in such a manner that, firstly, deflection of the shafts of the longitudinal shaft assembly is avoided and, secondly, a maximum amount of crash energy is absorbed by deformation work.

As a result of the guidance of the first shaft by means of the balls of the ball-type constant velocity joint as it penetrates the second shaft, deflection of the first shaft with respect to the second shaft is prevented, so that a directed telescoping of the longitudinal shaft assembly is made possible. In this connection, in particular the wall thicknesses of the first shaft and of the second shaft, and the stops and diameter reductions, are adapted precisely to the particular components of the longitudinal shaft assembly, so that the crash energy present is absorbed in a predetermined manner, in particular in stages, by adjustable deformation forces of the longitudinal shaft assembly. Consequently, on the one hand high deformation forces during the crash, which can lead to deflection of components of the longitudinal shaft assembly into the vehicle interior while a sufficient guide length is not yet available within the longitudinal shaft assembly, are avoided and, on the other, a maximum amount of deformation energy is consumed since the longitudinal shaft assembly permits maximum possible deformation forces in predetermined travel sections.

A further arrangement of a longitudinal shaft assembly for a motor vehicle is provided, which has at least a first shaft and a second shaft, the first shaft having a spigot with a first end and a second end; a ball-type constant velocity joint for connecting the first shaft to the second shaft, the ball-type constant velocity joint being mounted on the second end; and at least one central bearing for supporting the longitudinal shaft assembly with respect to a body, the central bearing having at least one rolling bearing which is mounted on the first end of the spigot on the first shaft and a circumferential detent groove being provided on the spigot directly in front of the rolling bearing, in which detent groove balls of the ball-type constant velocity joint come to lie at least temporarily in the event of a crash, the detent groove being a region of the spigot with a reduced first diameter.

In this longitudinal shaft assembly, the rolling bearing of the central bearing bears with its inner ring against a shoulder of the first shaft. Accordingly, the circumferential detent groove is provided on the side of the rolling bearing oriented towards the ball-type constant velocity joint of the longitudinal shaft assembly, so that the spigot of the first shaft is arranged between the rolling bearing and the ball-type constant velocity joint, along which spigot the balls of the ball-type constant velocity joint move in the event of a crash. Through the reduction of the diameter in the region of the spigot which forms the detent groove, the balls are guided onto a smaller first diameter in front of the rolling bearing. With the same arrangement of the individual components as in conventional longitudinal shaft assemblies, this provides the possibility of generating smaller deformation forces, and therefore preventing a possible deflection of the shafts of the longitudinal shaft assembly during the telescoping of the shafts as a result of a crash. These smaller deformation forces result primarily from the fact that the balls are supported between the rolling bearing and the diameter reductions of the second shaft, and that, as a result of the arrangement of the balls in the detent groove, less deformation of the second shaft takes place, especially in a first diameter reduction of the second shaft. The maximum deformation forces are thereby reduced. In particular, in this way a longitudinal shaft assembly is provided with which deformation forces of less than 80 kN, in particular less than 60 kN, are generated in a crash, and at the same time a deformation energy as high as possible is consumed by the longitudinal shaft assembly as a function of travel.

By means of the detent groove, (with an otherwise identical configuration of the longitudinal shaft assembly) the balls of the ball-type constant velocity joint are arranged on a smaller diameter (in the detent groove) as the shafts of the longitudinal shaft assembly are telescoped together, so that the second shaft is now deformed to a lesser degree, in particular in the region of a first diameter reduction. This ensures that the wall of the second shaft, in particular in the region of a first diameter reduction, is deformed only to a degree such that splitting open of the wall, and an associated loss of guidance of the balls between spigot and second shaft, is avoided. Through the introduction of a detent groove, therefore, the wall of the second shaft remains closed and therefore prevents a deflection of a component of the longitudinal shaft assembly out of the longitudinal direction of the motor vehicle, with a concurrent maximum possible reduction of the crash energy through deformation work. As a result of the guidance of the spigot of the first shaft by the balls of the ball-type constant velocity joint, which in turn are supported against the wall of the second shaft, the coaxiality of the first and second shafts is therefore preserved during the telescoping of the shafts.

According to a further arrangement of the longitudinal shaft assembly, a first diameter of the detent groove may be at least as large as a smallest force-transmitting second diameter of the first shaft. The first diameter of the detent groove may not be the smallest diameter of the first shaft. Therefore, the first diameter of the detent groove may be designed such that it is at least as large as a smallest force-transmitting second diameter of the first shaft, which is present in particular in the region of the connection between spigot and inner part of the ball-type constant velocity joint. This connection between spigot and inner part of the ball-type constant velocity joint may be implemented positively by a spline, but may also be effected non-positively by a suitable press fit of the joint inner part on the spigot.

According to a further arrangement, the second shaft may have a first diameter reduction and at least a second diameter reduction. In particular, further diameter reductions may be provided which are provided in the region of the ball-type constant velocity joint in the joint outer part, in order to limit the axial displacement of the ball-type constant velocity joint. The first and second diameter reductions of the second shaft are therefore arranged at a distance from the ball-type constant velocity joint, and in particular are adapted to the parts of the motor vehicle surrounding the longitudinal shaft assembly. If different diameter reductions are provided, it is possible, in particular, to change the deformation forces arising through the stepwise telescoping of the shafts and to absorb crash energy in a defined manner by deformation work. At the same time, it is prevented that, through an excessive diameter reduction, the wall of the second shaft splits open as a result of the deformation by the balls and therefore loses its guidance properties as the telescoping advances.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned for illustrative purposes. Further, the embodiments set forth herein are exemplary and are not intended to be exhaustive or otherwise limit or restrict the claims to the precise forms and configurations shown in the drawings and disclosed in the following detailed description. In the Figures, the same reference symbols are used for the same components.

FIG. 2 shows the longitudinal shaft assembly of FIG. 1 during telescoping.

FIG. 3 shows a detail of FIG. 2.

DETAILED DESCRIPTION

Figure 1:
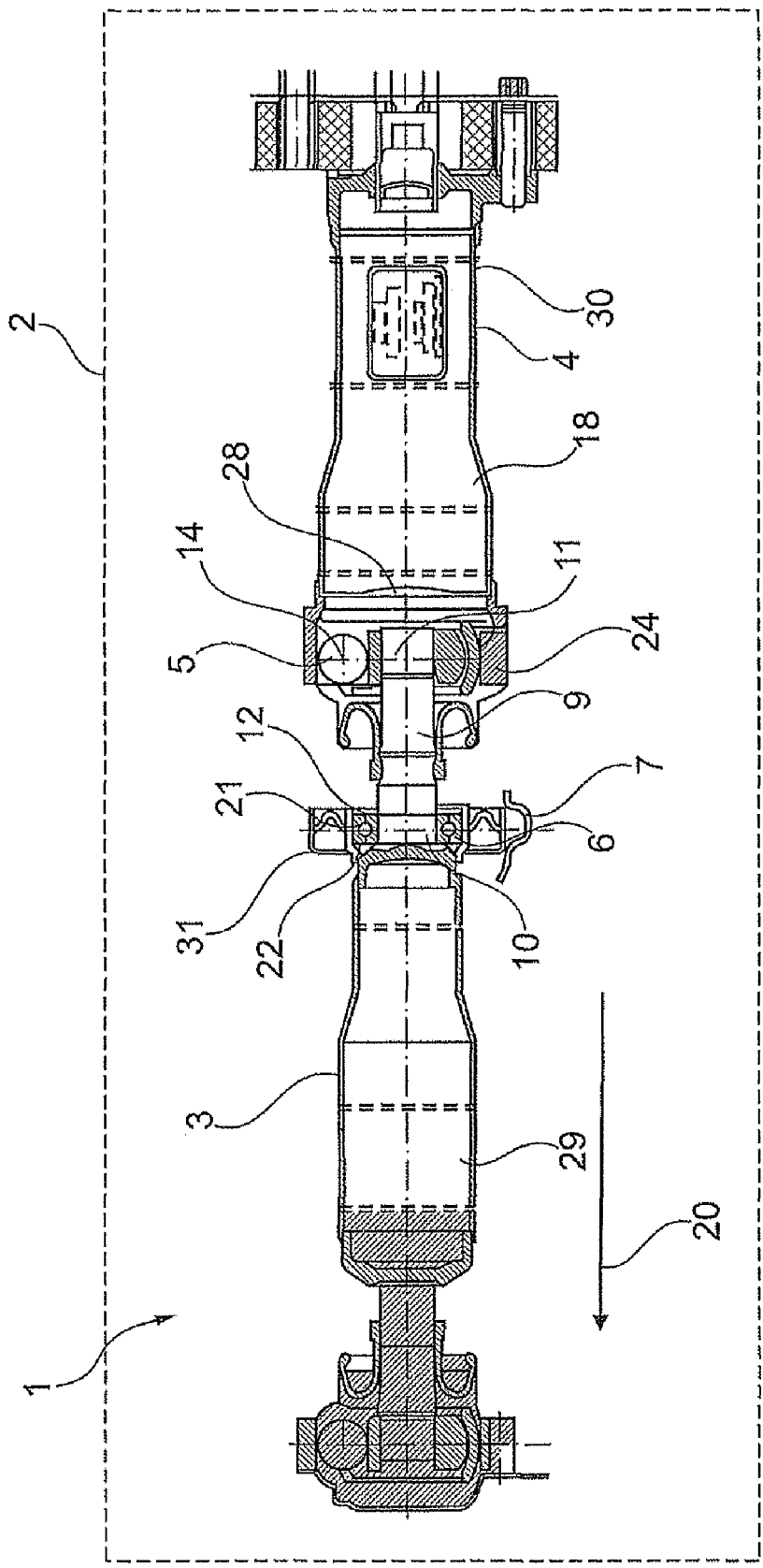
FIG. 1 is a longitudinal section of a first embodiment of a longitudinal shaft assembly.

FIG. 1 shows a longitudinal shaft assembly 1 of a motor vehicle 2, the direction of travel 20 of the motor vehicle 2 being shown in the lower part of FIG. 1. The longitudinal shaft assembly 1 includes at least a first shaft 3 and a second shaft 4 which are connected to one another by means of the ball-type constant velocity joint 5, here in the form of an axially displaceable joint ("plunging joint"), shown at the centre. The first shaft 3 includes a plurality of components, as is shown in FIG. 1. In particular, a further ball-type constant velocity joint is arranged on the first shaft 3 on a spigot of the first shaft 3, shown on the left in FIG. 1. Provided at the other end of the first shaft 3 is a spigot 9 which extends into the ball-type constant velocity joint 5 of the longitudinal shaft assembly 1. Spigot 9, which is connected on one side by its second end 11 to the inner part 23 of the ball-type constant velocity joint 5 and on the other side to the first hollow shaft portion 29 of the first shaft 3, has on its first end 10 a rolling bearing 12 which is connected by its inner ring 21 to the spigot 9 and is fastened by its outer ring 22 to a support 31 of the body 7. The rolling bearing 12 forms a central bearing 6 of the longitudinal shaft assembly 1, by means of which the longitudinal shaft assembly 1 is connected to the body 7 of the motor vehicle 2 and at the same time is damped with regard to vibration.

The second shaft 4 may also have a plurality of components, including at one end a connection to a drive input or output component, shown on the right in FIG. 1, a second hollow shaft portion 30 of the second shaft 4 and, at another end, an outer part 24 of the ball-type constant velocity joint 5, here in the form of an axially displaceable joint. Covers 28 may be provided inside the second shaft 4 which, firstly, effect sealing of the ball-type constant velocity joint 5 and, secondly, serve to absorb crash energy, since the spigot 9 must penetrate the cover 28 as the first shaft 3 moves into the second shaft 4. In addition, the second shaft 4 has a first diameter reduction 18 which is adapted, in particular, to the shapes and configurations of the surrounding body 7. More detailed explanations of the function of this first diameter reduction 18 will follow.

The ball-type constant velocity joint 5 is connected by its inner part 23 to the first shaft 3 and by its outer part 24 to the second shaft 4. The ball-type constant velocity joint 5 is configured here as an axially displaceable joint ("plunging joint"), so that the joint inner part 23 can be moved axially with respect to the joint outer part 24. The driving forces are transmitted via balls 14 from the joint outer part 24 to the joint inner part 23 (or inversely), and a cage 25 for guiding the balls 14 inside the ball-type constant velocity joint 5 may be provided.

FIG. 2 shows a longitudinal shaft assembly 1 according to FIG. 1 after being telescoped together 8 following a crash, as a result of which the first shaft 3 of the longitudinal shaft assembly 1 has been pushed into the second shaft 4 in the manner shown. Through the non-positive or at least partially positive connection between the second end 11 of the first shaft 3 and the inner part 23 of the ball-type constant velocity joint 5, at least the joint inner part 23 is pushed with the first shaft 3 into the second shaft 4.

As a result of the telescoping 8, the cage 25 of the ball-type constant velocity joint 5 is burst, so that in the course of the telescoping 8 the balls 14 are pushed from the inner part 23 of the ball-type constant velocity joint 5 onto the spigot 9. This releasing of the balls 14 of the ball-type constant velocity joint 5 from the ball-type constant velocity joint 5 as the cage 25 bursts is caused, in particular, by a first stop 27 of the outer part 24 of the ball-type constant velocity joint 5. During the telescoping 8, the balls 14 are moved in the direction of the rolling bearing 12, which is fastened to the first shaft 3, in particular to the first end 10 of the spigot 9, and come to lie in front of the rolling bearing 12. During the telescoping 8, the balls 14 are brought by the rolling bearing 12 into contact with the first diameter reduction 18 of the second shaft 4, a further significant part of the crash energy being absorbed here through deformation work of the wall 26 of the second shaft 4 in the region of the first diameter reduction 18 in the following movement. In the course of the telescoping 8, the balls 14 are pressed against the diameter reduction 18 and deform the wall 26 of the second shaft 4. As this happens, the second shaft 4 performs, in particular, a guidance function with respect to the first shaft 3, which function is produced by the arrangement of the balls 14 of the ball-type constant velocity joint 5 between spigot 9 and/or rolling bearing 12 of the first shaft 3 and the wall 26 of the second shaft 4, and/or the first diameter reduction 18 of the second shaft 4. During the telescoping 8 of the longitudinal shaft assembly 1 and the ensuing movement of the first shaft 3 into the second shaft 4, covers 28 provided in the second shaft 4 are, in particular, penetrated and/or displaced, so that here, too, a large measure of crash energy can be absorbed through deformation work.

FIG. 3 shows a detail of FIG. 2 in an enlarged representation. FIG. 3 shows the arrangement of the balls 14 in front of the rolling bearing 12 on the spigot 9 as a result of the telescoping 8, the balls 14 being fixed between the rolling bearing 12 and a first diameter reduction 18 of the second shaft 4. In this case, the rolling bearing 12 is supported positively on one side against the first shaft 3, the balls 14 bearing primarily, as shown here, against the outer ring 22 of the rolling bearing 12. This may lead to fracture of the outer ring 12, which fracture can also absorb a large measure of crash energy. After the fracture of the outer ring 22, the balls are gripped between the inner ring 21 and the first diameter reduction 18. Through the support of the inner ring 21 against the second stop 32 on the shaft 3, the wall 26 of the second shaft 4 is deformed in the region of the first diameter reduction 18 as the telescoping of the longitudinal shaft assembly 1 progresses.

Figure 4:
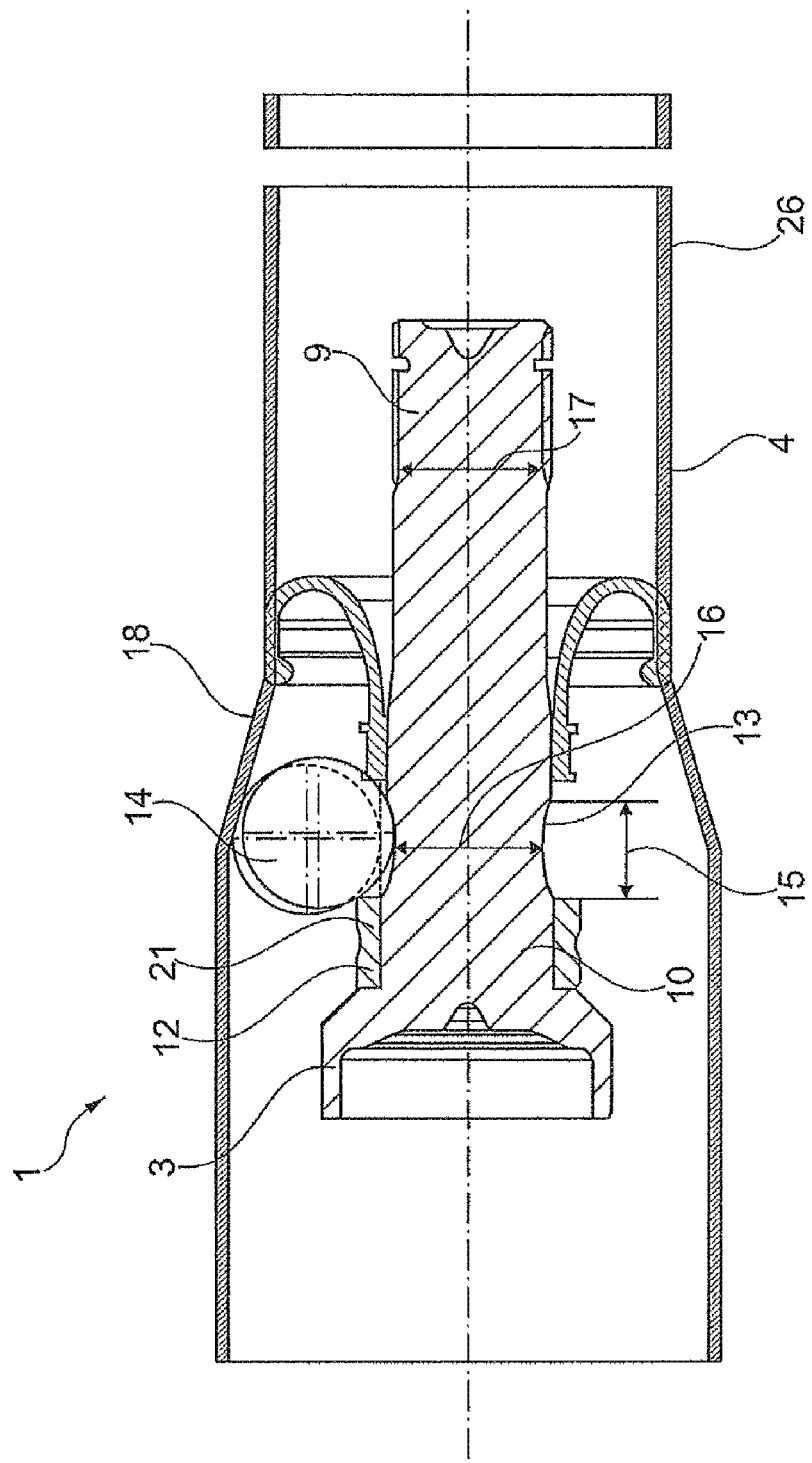
FIG. 4 is an illustration of a further embodiment of the longitudinal shaft assembly in detailed view during telescoping as a result of a crash.

FIG. 4 shows a further configuration of the longitudinal shaft assembly 1, the detail illustrated on an enlarged scale in FIG. 3 being shown here in a further configuration. As a result of a telescoping 8, the spigot 9 of the first shaft 3 has penetrated the interior of the second shaft 4, the balls 14 of the ball-type constant velocity joint 5 bearing against the first diameter reduction 18 of the second shaft 4 on one side and, on the other side, against the inner ring 21 of the rolling bearing 12, which is arranged on the first end 10 of the spigot 9 of the shaft 3. In this case, a detent groove 13 with a first diameter 16 is provided in a region 15 of the spigot 9 of the first shaft 3, so that the balls 14 come to lie on a first diameter 16 as small as possible before they consume a substantial portion of the crash energy through deformation work as a result of the deformation of the wall 26 of the second shaft 4. In the upper part of FIG. 4, the position of the balls 14 without a detent groove 13 is also indicated, with the abutment of the balls 14 against the first diameter reduction 18 located in a region outside the contacting arising as a result of the detent groove 13. Through this arrangement of the balls 14 further inwards, a smaller deformation of the wall 26 of the second shaft 4 by the balls 14 is achieved, so that failure of the second shaft 4 in the form of rupturing of the wall 26 is prevented and a maximum amount of crash energy can be consumed by continuous (stepwise) deformation. In particular, the guidance of the first shaft 3 by the balls 14 and the wall 26 of the second shaft 4 can also be ensured in this manner during the whole of the telescoping 8.

In designing the first diameter 16 of the detent groove 13, particular care should be taken to ensure that first diameter 16 is configured at least as large as the smallest force-transmitting second diameter 17, which is usually provided at the connection between spigot 9 and inner part 21 of the ball-type constant velocity joint 5. Through such a configuration of the first diameter 16, the spigot 9 does not fail in the region 15 of the detent groove 13 but, if at all, in the region of the second diameter 17.

Figure 5:
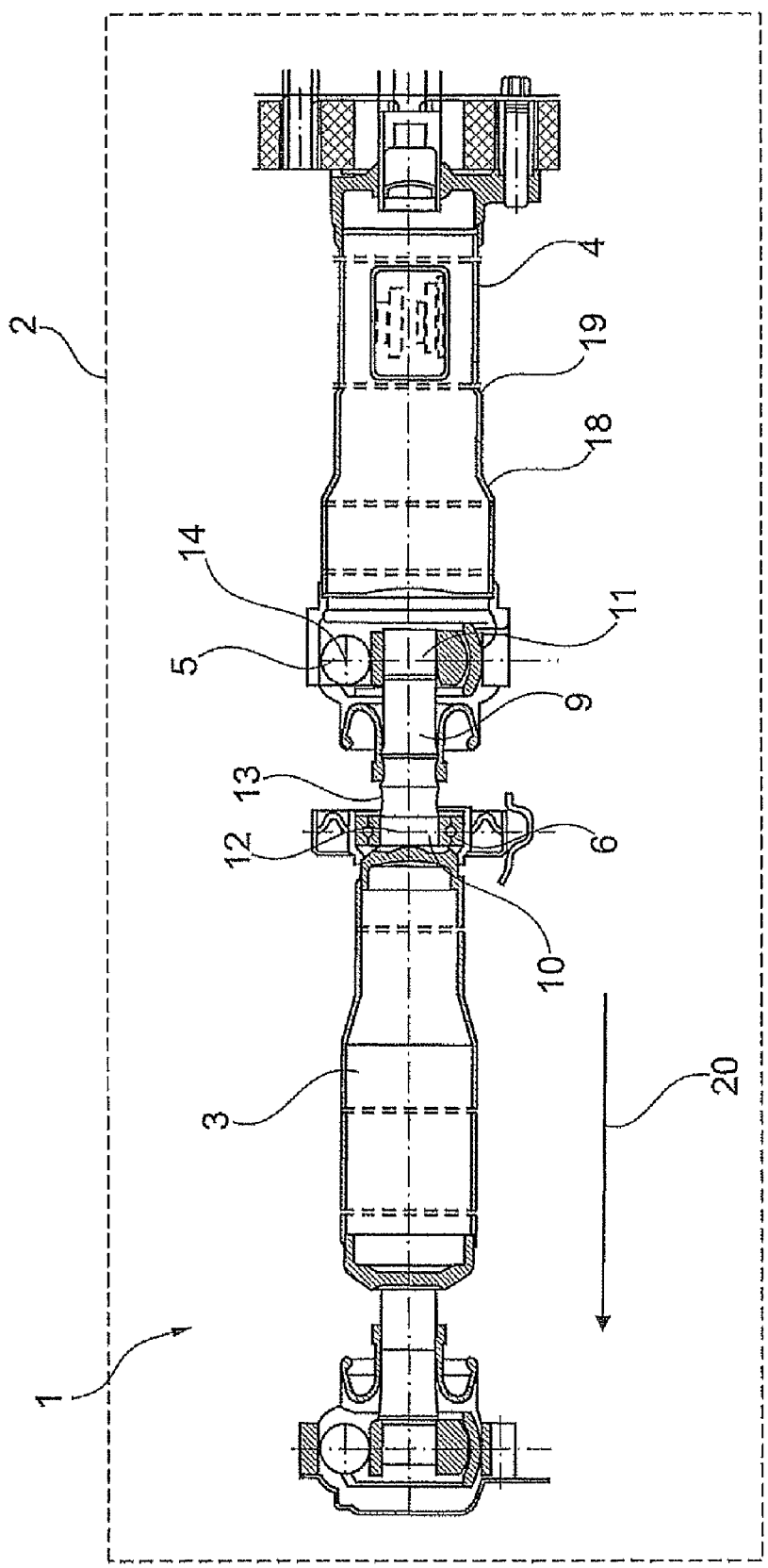
FIG. 5 is a longitudinal section of the further embodiment of the longitudinal shaft assembly prior to telescoping.

FIG. 5 shows a longitudinal shaft assembly 1 according to FIG. 4 prior to a telescoping 8, a detent groove 13 being provided on the spigot 9 of the first shaft 3 in the region in front of the rolling bearing 12 of the central bearing 6. Spigot 9 is connected by a second end 11 to a ball-type constant velocity joint 5 and by a first end 10 to the rolling bearing 12 of the central bearing 6. As a result of the travel direction 20, in the event of a crash (frontal crash) of the motor vehicle 2 a telescoping 8 takes place, so that the balls 14 come to lie in the manner shown in FIG. 4 in the detent groove 13 of the spigot 9, and can thus generate a maximum amount of deformation energy with the wall 26, thereby reducing the crash energy. In this case, a first diameter reduction 18 and a second diameter reduction 19 are provided in the second shaft 4, through which the deformation work to be exerted can be exerted in a predetermined manner by the longitudinal shaft assembly 1 while avoiding force peaks.

Through the detent groove 13, larger ball-type constant velocity joints 5 can also be used with otherwise identical components of the longitudinal shaft assembly 1, since the balls 14, in comparison to the spigot 9 without detent groove 13, have the same contact points with the first or second diameter reduction 18, 19 as a result of the lower arrangement of the balls 14 in the detent groove 13. For this case, therefore, only the ball-type constant velocity joint 5 and the connection structure of the joint outer part 24 to the second shaft 4 would need to be specifically adapted, since the spigot 9 of the first shaft 3 additionally has a corresponding detent groove 13 in order to receive, and compensate for the size of, the larger balls 14 of the larger ball-type constant velocity joint 5. Through the substitution of these components, a longitudinal shaft assembly 1 can be provided which, in particular, can be used in the same motor vehicles 2 with different drive power without additional expensive test programmes.

For the proposed longitudinal shaft assembly 1, the orientation in the motor vehicle 2 is immaterial; it can also be installed in the manner described with inverse direction of travel 20.

The invention claimed is:

1. A longitudinal shaft assembly for a motor vehicle, comprising:
 a first shaft and a second shaft, the first shaft having a spigot with a first end and a second end;
 a ball-type constant velocity joint for connecting the first shaft to the second shaft, the ball-type constant velocity joint being mounted on the second end; and at least one central bearing for supporting the longitudinal shaft assembly with respect to a body, the central bearing having at least one rolling bearing which is mounted on the first shaft on the first end of the spigot,
 wherein a circumferential detent groove is provided on the spigot directly in front of the rolling bearing, in which detent groove balls of the ball-type constant velocity joint come to lie at least temporarily in the event of a crash, the detent groove being a region of the spigot with a reduced first diameter.

2. The longitudinal shaft assembly according to claim 1, wherein a first diameter of the detent groove is at least as large as a smallest force-transmitting second diameter of the first shaft.

3. The longitudinal shaft assembly according to claim 2, wherein the smallest second diameter of the first shaft is in the region of the connection between the spigot and an inner part of the ball-type constant velocity joint.

4. The longitudinal shaft assembly according to claim 1, wherein the second shaft has a first diameter reduction and at least a second diameter reduction.

5. A motor vehicle with a longitudinal shaft assembly according to claim 1.

6. The longitudinal shaft assembly according to claim 1, wherein the balls of the ball-type constant velocity joint come to lie in the detent groove and bear against an inner ring of the rolling bearing at least temporarily in the event of a crash.

* * * * *